United States Patent [19]
Webster

[11] 3,791,098
[45] Feb. 12, 1974

[54] METHOD OF MANUFACTURING A PRESSURIZED DISPENSING PACKAGE

[75] Inventor: Milo E. Webster, Braintree, Mass.

[73] Assignee: The Gillette Company, Boston, Mass.

[22] Filed: Feb. 8, 1971

[21] Appl. No.: 113,545

[52] U.S. Cl............................ 53/30, 53/36, 156/85, 264/96, 264/230, 264/248, 425/DIG. 214, 425/DIG. 216
[51] Int. Cl... B65b 43/00, B29c 17/07, B29c 27/00
[58] Field of Search.................... 264/89, 90, 92–94, 264/96–99, 230, 238, 248, 249; 156/85, 86; 425/326, 387, 388, DIG. 214, DIG. 216; 222/94–96, 136; 53/30, 36; 29/421, 447, 455, 469

[56] References Cited
UNITED STATES PATENTS

| | | | |
|---|---|---|---|
| 3,540,623 | 11/1970 | Wittke et al..................... | 222/136 X |
| 3,390,426 | 7/1968 | Turner et al................... | 264/99 UX |
| 2,331,702 | 10/1943 | Kopitke................................ | 264/97 |
| 3,662,094 | 5/1972 | Wetmore et al................ | 264/230 X |
| 3,544,672 | 12/1970 | Goda et al. .......................... | 264/230 |
| 3,305,890 | 2/1967 | Senior et al....................... | 264/97 X |
| 3,345,227 | 10/1968 | Park...................................... | 156/86 |
| 2,947,449 | 8/1960 | Hernadez......................... | 222/136 X |
| 3,608,781 | 9/1971 | Flynn............................... | 222/136 X |

*Primary Examiner*—Robert F. White
*Assistant Examiner*—J. H. Silbaugh
*Attorney, Agent, or Firm*—Willis M. Ertman

[57] ABSTRACT

A pressurized dispensing package includes a rigid outer container and an inner container disposed within the outer container. The inner container is formed of a length of organic plastic tubing that has two discrete stable dimensional states. In forming the inner container, a portion of the tubing is disposed in a mold and expanded against the wall of the mold to form a thin walled body portion. A seal is formed in one end of the body portion and the other end of the tubing is secured to a valve assembly by positioning that end over a stub of the valve assembly and heating that end portion to shrink it and form a firm mechanical joint. The inner container may have a dip tube in it secured to the bottom of the container, and in another embodiment, this tube extends entirely through the inner container.

10 Claims, 12 Drawing Figures

PATENTED FEB 12 1974 3,791,098
SHEET 1 OF 4
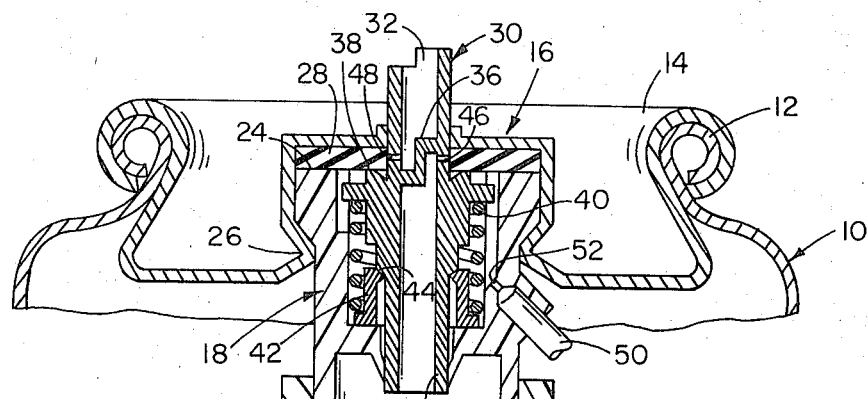
FIG 1
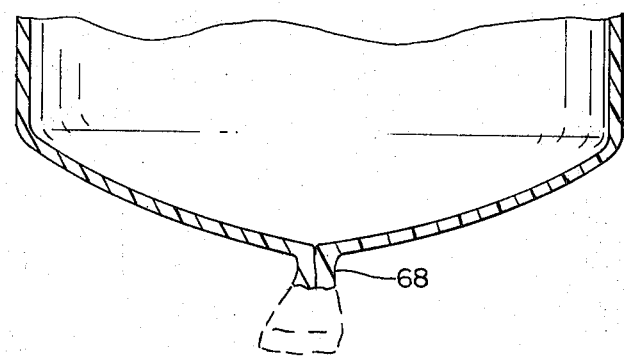
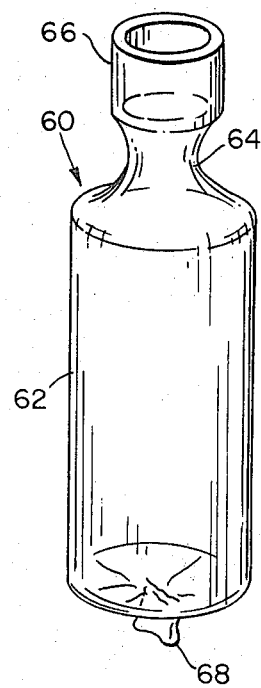
FIG 2

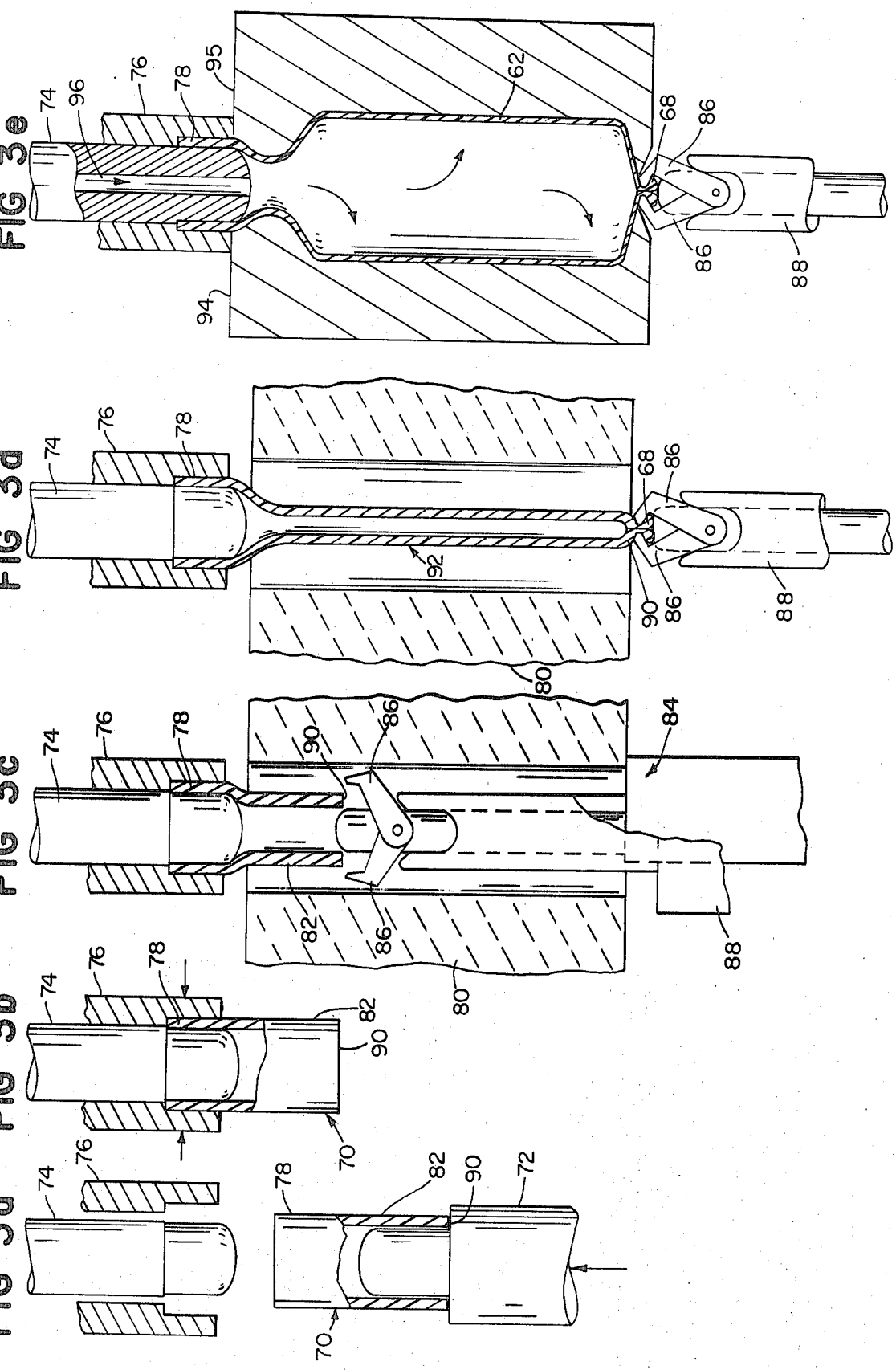

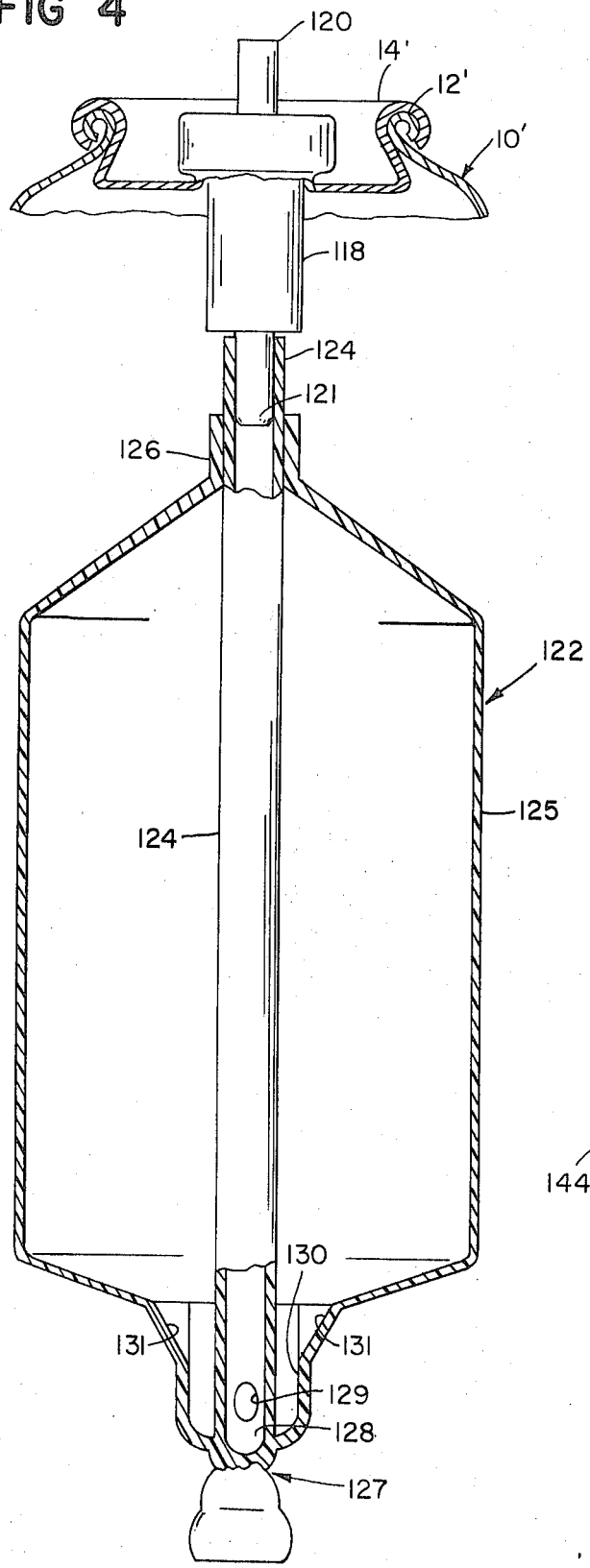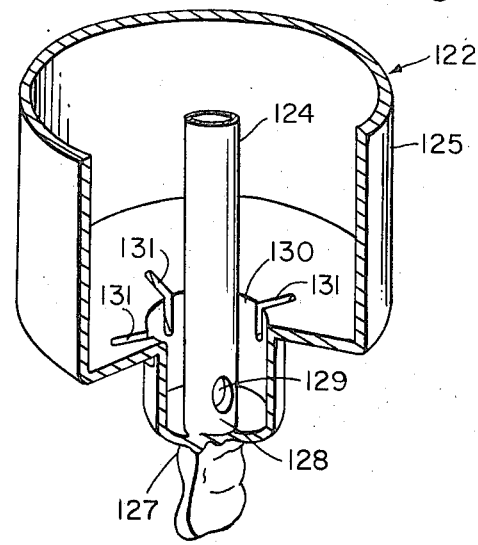

PATENTED FEB 12 1974 3,791,098

METHOD OF MANUFACTURING A PRESSURIZED DISPENSING PACKAGE

SUMMARY OF INVENTION

This invention relates to methods for making dispensing packages and more particularly to a method for making an improved dispensing package that has a valve structure for isolating one or more ingredients during non-use and controlling the coordinated dispensing of one or a mixture of materials under pressure to provide a desired product.

Frequently it is desired to isolate an ingredient during storage. For example, one may wish to dispense a product that results from mixing, at the time of dispensing, of two different ingredients that are stored separately, or in isolation from each other so that those ingredients will maintain their effective properties for an indefinite period of time during storage. A variety of products may be usefully so dispensed, an example being a two-part, self-heating, cosmetic composition applied to the human skin, one part containing a reducing agent and the other part containing an oxidizing agent which is reactive with the reducing agent to liberate heat. In many instances, it is desirable that the dispensing package also provide accurate proportioning of the ingredients to be mixed for interaction prior to discharge.

As another example, one may wish to isolate from an external metal container, and to dispense products that are corrosive to metal. Examples of such products are water-base antiperspirants, shampoos, detergents, and the like.

As still another example, ingredients could be stored and dispensed isolated from propellant where it is desired to dispense a viscous, non-foamy product, a powder, or the like. For instance, toothpastes or gel materials, typically dispensed from deformable metal or plastic tubes, could be pressure dispensed, as well as viscous foodstuffs, such as peanut butter.

Such dispensing packages should be designed for production in large quantities and in a manner that minimizes cost. The assembly should be constructed so that it may be easily operated in a safe and reliable manner.

Typically, prior dispensing packages of these types had a rigid outer container, a valve assembly, a flexible inner container that is secured to the valve assembly, and, where required, one or more dip tubes. However, prior constructions have had severe limitations. In some constructions, the inner container had an outer diameter of less than an inch to permit it to be introduced through the opening in the outer container. While such dispensing packages were useful, the restriction on inner container diameter limited the volume of ingredient that could be stored in the inner container. A larger volume in the inner container could reduce the dimensional criticality of the metering orifice between the inner container and the dispensing valve and therefore that dimension would be easier to control within production tolerances. Alternatively, a greater quantity of the ingredient in the inner container could be used if desired, or, for dispensing the aforesaid two-part, self-heating cosmetic composition, a larger inner container would permit a lower strength oxidizer to be used in the inner container because of the increased capacity of the container.

Also, in prior constructions, it was necessary to secure the inner container to the remainder of the package, such as to the valve assembly, by heat sealing or a chemical bonding process to provide a reliable seal that would maintain the ingredients isolated until the dispensing valve was actuated. Forming such seals requires expensive heat sealing or chemical bonding machinery.

Accordingly, it is an object of this invention to provide a method for manufacturing a novel and improved pressurized dispensing package.

Another object of the invention is to provide a novel and improved method for manufacturing pressurized dispensing package that is arranged to dispense a mixture of two ingredients.

Other objects are to provide novel and improved methods for manufacturing novel and improved dispensing packages for dispensing, under pressure, isolated ingredients (containing at most negligible amounts of propellants), corrosive ingredients, viscous ingredients and similarly difficult to dispense materials.

In accordance with the invention there is provided a dispensing device of the pressurized type which has a rigid outer container, a valve assembly secured to the outer container and a unitary inner container of organic plastic that is supported on stub connector structure of the valve assembly. This tubular member is of the type having two discrete stable dimensional shapes, the dimension of the tubular member being larger in one state than in the other, and the plastic being responsive to application thereto of a selected energy so as to shrink from one state to the other. The stub of the valve assembly has a dimension intermediate of the two stable dimensions of the plastic tubular member. The inner container has a thin tubular flexible walled body portion and a mouth portion of greater wall thickness. The mouth portion is secured to the stub connector structure (e.g., to the stub, or to a dip tube mounted on the stub), with the organic plastic in the mouth portion in a non-stable dimensional state intermediate of its two stable states, in response to a previous application of the proper selected energy, thereby exerting compressive force on the stub connector structure to provide a solely mechanical seal. This mechanical seal prevents migration of ingredients from one container to another in either direction.

An exemplary suitable organic plastic is a "heat shrinkable" plastic, of the type which shrinks from the larger to the smaller of its stable dimensional states upon heating.

In preferred embodiments, the inner and outer containers each contain a separate ingredient, which are maintained separated during non-use, and mixed in the valve assembly as they are dispensed. In one such embodiment, a dip tube extends entirely through the inner container, is sealed from it (as by forming in the inner container a shrinkable organic plastic bottom portion, which is then shrunk about the dip tube to provide a compressive, mechanical joint), and is open to the outer container to discharge the ingredient of the outer container. An additional passage in the valve assembly into the inner container is provided to discharge the ingredient of the inner container.

In another preferred embodiment, a dip tube is sealed within the inner container, and has an orifice for discharging an ingredient therefrom. In such an embodiment, a sole ingredient to be dispensed may be located in this inner container, with the outer container containing only propellant.

In preferred methods, this inner container is manufactured from a length of heat shrinkable plastic tubing material, suitable plastics including polyvinylchlorides, polyesters, polyolefins and polyethylenes. An end of a length of the tubing, which is later to be heat shrunk to provide a compressive, mechanical seal, is secured in a supporting mandrel which provides thermal isolation and the remaining length of the tubing is exposed to a heat source, and expanded by increasing the pressure in its interior to expand that material against the cool walls of the mold in a molding operation. This operation reduces the thickness of the wall to about twenty percent or less of its original dimension.

The formed bottle is then ejected from the mold and the end portion is ultimately heated and the material shrunk so that the end portion exerts substantial compressive force on the valve structure over which it was inserted before shrinking, and seals the container at that end. After the container has been suitably filled and sealed, the assembled valve assembly and inner container is then inserted in and sealed to the outer container and the package is pressurized. In a preferred method, the length of tubing to be expanded is elongated during exposure to a heat source, and the elongated section is then disposed in the mold and expanded.

The invention provides a dispensing package having an inexpensive flexible inner container which may have a substantially larger diameter than the aperture of the outer container through which the inner container is inserted; which can be simply and effectively sealed to the valve assembly; and which avoids objectionable "suckback" phenomena due to the flexibility of the inner container body.

Other bojects, features and advantages of the invention will be seen as the following description of particular embodiments progresses, in conjunction with the drawings, in which:

FIG. 1 is a sectional view of portions of a dispensing package constructed in accordance with the invention;

FIG. 2 is a perspective view of the inner container employed in the dispensing package shown in FIG. 1;

FIG. 3a through FIG. 3e are a series of five views showing steps in the method of making the inner container shown in FIG. 2;

FIG. 4 is a sectional view of portions of a second embodiment of a dispensing package constructed in accordance with the invention;

FIG. 5 is a perspective view of the lower portion of the inner container employed in the dispensing package of FIG. 4;

FIG. 6 illustrates a step in the method of making the inner container of FIGS. 4 and 5;

DESCRIPTION OF PARTICULAR EMBODIMENTS

Figure 7:
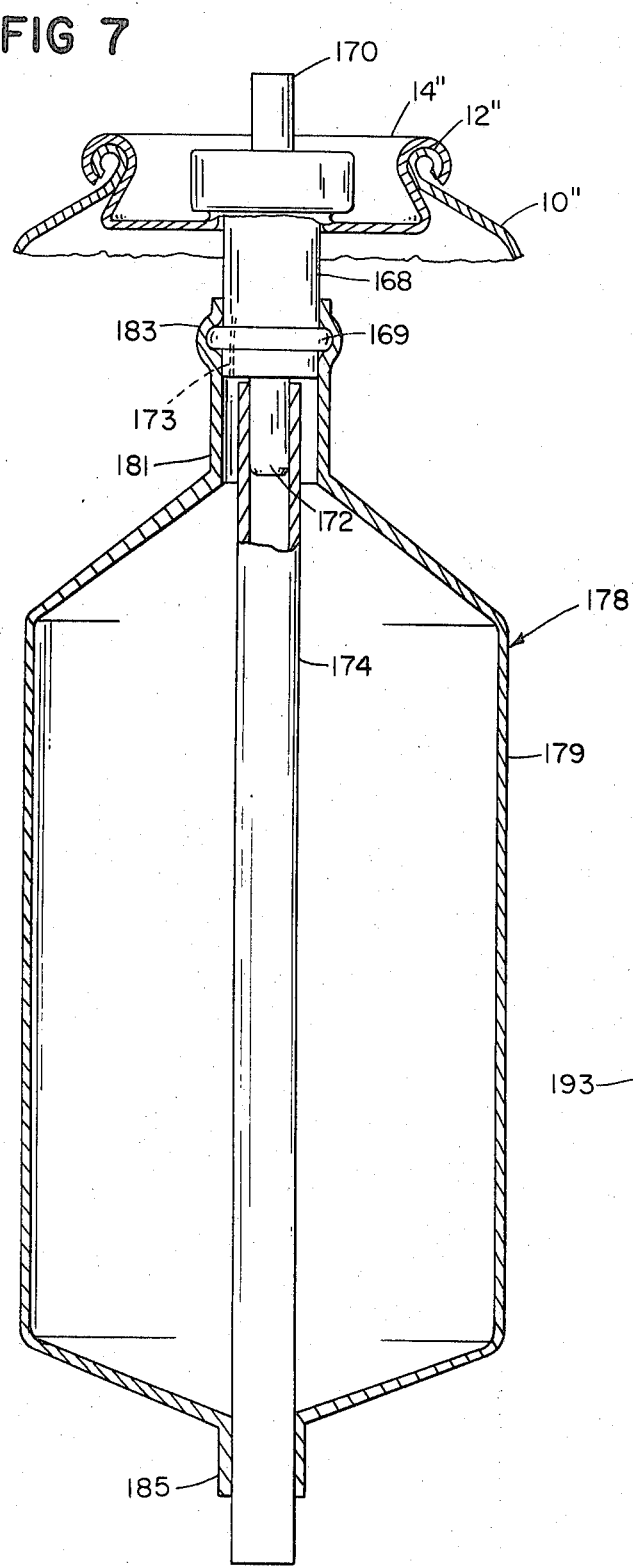
FIG. 7 is a sectional view of portions of a third embodiment of a dispensing package constructed in accordance with the invention; and, FIG. 8 illustrates a step in the method of making the inner container employed in the dispensing package of FIG. 7.

The dispensing package shown in FIG. 1 is of the general type disclosed in Nissen Pat. No. 3,241,722 and includes rigid walled outer container 10 five inches long and two inches in diameter that has a one inch diameter opening defined by bead 12 in its top wall to which the mounting cup 14 is secured. Cup 14 in turn supports a valve assembly 16 that includes a housing 18 of polyethylene that has at its lower end a support stub 20 that has a flange surface or rib 22. At the upper end of housing 18 is an annular surface 24 and mounting cup 14 is crimped into recessed intermediate portion 26 to force surface 24 of housing 18 into gasket 28 to secure the gasket and provide a seal at that point.

Disposed in valve housing 18 is a valve stem 30 that has upper and lower passageways 32, 34 separated by partition 36. Stem valve surface 38 is urged into engagement with gasket 28 by spring 40. An annular insert 42 has flexible fingers which cooperate with stem surface 44 and provide initial resistance to a downwardly directed force against stem 30 and spring 40 so that the valve stem is moved rapidly to fully open position with a snap action. Stem 30 has a first port 46 that provides communication between passage 34 and the mixing chamber defined by the valve housing when the valve is in open position and a second port 48 that provides communication between the valve housing and discharge passage 32 when the valve is in the open position. A suitable valve cap may be disposed on valve stem 30 if desired as a function of the type of material to be dispensed. Dip tube 50, secured in valve housing 18, provides communication between the outer container and the mixing chamber through port 52.

Secured to stub 20 of housing 18 is a polyethylene inner container 60 that has a length of 3 ⅝ inches and a diameter of 1 ¼ inches. As shown in FIG. 1, the body portion 62 of container 60 has a wall thickness of 0.005 inch; the neck portion 64 has an inner diameter of one half inch and a wall thickness of about 0.040 inch; and the mouth portion 66 has an inner diameter of ⅝ inch and a wall thickness of 0.030 inch. A seal joint 68 is formed at the bottom of the inner container.

This inner container is formed, as shown in the series of diagrams in FIG. 3, from a section 70 of irradiated expanded polyethylene tubing that has an inner diameter of ⅝ inch, a wall thickness of 0.030 inch and a length of 1 ¾ inches. Tubing length 70 is positioned on a support mandrel 72 and its upper end 78 is inserted into a cooperating clamp mandrel 74 which has a split ring, heat sink collar 76 surrounding the lower end of mandrel 74. After tubing length 70 is inserted over the lower end of mandrel 74, heat sink collar 76 is brought into clamping engagement to secure the length of tubing 70 to mandrel 74 and at the same time provide thermal isolation to the upper end portion 78 of tubing section 70. The supported length of tubing is then subjected to a heating environment by heater elements diagrammatically indicated at 80 so that the bottom portion 82 is heated to a temperature in the order of 250°F and allowed to shrink to its original extruded dimensions--⅜ inch inner diameter and 0.060 inch wall thickness as indicated in FIG. 3c.

While tubing portion 82 is still hot, a sealing device 84 having pincher elements 86 and actuator 88 is positioned adjacent the bottom end 90 of the tube 70 and the pinchers 86 are actuated to heat seal the lower end 90 of the tube 70. The heated portion 82 of the tube is then stretched to a length of about 4 inches and held in that position by pinchers 86.

The stretched sealed length 92 of tubing is then moved away from the heaters 80 into a position adjacent mold members 94, 95 which are then moved into closed position around the length of tubing. Air is introduced through port 96 in mandrel 74 to expand the heated length 92 of tubing in a blow molding operation against the cool surfaces of mold members 94 and 95 to provide a body portion 62 that has a wall thickness of about 0.005 inch. The mold halves 94, 95 are then opened and the molded bottle is then blown off mandrel 74. This molded bottle is shown in FIG. 2.

The molded bottle 60 is then filled with its ingredient, in this particular embodiment, hydrogen peroxide, and mouth portion 66 is slid over stub 20 so that the upper end of the mouth portion 66 extends above flange surface 22. The mouth portion of the bottle is then heated and it shrinks into intimate overlying compressive engagement with flange surface 22 and stub 20 to form a strong, leakproof mechanical seal between the inner container bottle 60 and the valve assembly. The outer container 10 is filled with its ingredient, in this embodiment a soap solution and a reductant, and the filled inner container with attached valve assembly-dip tube-mounting cup is inserted into the outer container. The flexible body 62 of the inner container is compressed as it passes through the opening defined by bead 12 in the upper wall of the outer container. The mounting cup assembly is crimped to the container bead 12, thus providing a sealed container. A suitable pressure generating propellent is introduced into the outer container.

In this dispensing package, the pressure of the propellent in the outer container 10 is applied against the flexible wall of the inner container 60 to the ingredient stored therein. To dispense a mixture of the two ingredients, valve stem 30 is depressed, moving valve surface 38 away from gasket 28 in a snap action and fully exposing orifices 46 and 48 to the mixing chamber defined by housing 18. The material in the inner container under pressure of the propellent against the thin wall 62 flows through passage 34 and metering passage 46 to the mixing chamber and the material in the outer container directly exposed to the propellent flows through dip tube 50 and metering passage 52 to that chamber. The two materials are mixed and the mixture is dispensed through passages 48 and 32 in stable condition ready for use. On release of valve stem 30, spring 40 acts to return the stem 30 to the position shown in FIG. 1 and close the valves.

In FIGS. 4 and 5, the dispensing package shown has a rigid walled outer container 10', 5 inches long and 2 inches in diameter, that has a one inch diameter opening defined by bead 12' in its top wall, to which mounting cup 14' is secured. A suitable valve assembly is supported within cup 14', and includes a polyethylene housing 118, which has a valve stem 120 protruding therefrom, that has a tapered lower surface 121. A dip tube 124 (outer diameter 0.175 inch, inner diameter 0.140 inch of non-irradiated polyethylene) is secured (e.g., heat-sealed) to the stem 120, and extends into a polyethylene inner container 122, that has a length of 3 ⅝ inches and a diameter which may be less than, equal to, or somewhat greater than the diameter of container 10'. An exemplary unconfined diameter of 2 ½ inches will allow the walls of container 10' to fully support the thin (0.005 inch) wall of the body portion 125 of inner container 122 when the inner container is filled. The neck portion 126 has an inner diameter of 0.175 inch. A seal joint 127 is provided at the bottom of the container, and the lower end 128 of dip tube 124 is heat-sealed to the bottom below the dip tube port 129. Web 130 has a wall thickness of about 0.043 inch, and defines a chamber at the lower or inner end of dip tube 124. Flow grooves 131 (about 0.190 inch maximum depth, and 0.090 inch wide) facilitate material flow into the chamber.

The inner container 122 may be formed, for example from a section of irradiated expanded polyethylene tubing having an inner diameter of 0.300 inch, a wall thickness of 0.043 inch, and a length of 6 inches. The tubing is placed in a mold 133, such as shown in FIG. 6. The upper end 134 of the tubing is positioned in a heat sink collar 135 and is inserted into a clamp mandrel 136, which has a split ring, heat sink collar 135 surrounding the lower end of mandrel 136. The lower end 140 of the tubing 132 is optionally pre-heat sealed to form the seal joint 127. The tube is heated (e.g., to about 270°F) and then inserted into a position between mold members 144, 146, which are then moved into closed positions as shown in FIG. 6. The mold members are shaped to form web 130 and grooves 131, as well as body portion 125. Air is introduced through ports 148 in mandrel 136 to expand the tubing in a blow molding operation against the cool surfaces of the mold members 144, 146 to provide body portion 125 with a wall thickness of 0.005 inch. The mold members 144, 146 are then opened and the molded bottle is blown off mandrel 136.

The dip tube 124 is then inserted through the neck 126 of container 122, and the lower end of the dip tube is heat sealed to the seal joint 127. Collapse of web 130 during the heat sealing operation may be prevented by continuing to blow air into container 122 or dip tube 124 or both. The neck portion 126 of the container is then heated so that it shrinks into intimate compressive engagement with dip tube 124 to form a strong, leakproof mechanical seal between inner container 122 and the valve assembly. Either before or after this heat shrink seal is made, the container 122 is filled with its ingredient. The outer container may then be filled with its ingredient (if it is to contain one), the inner container inserted into the outer container (the container 122 being compressed if necessary to pass through the opening defined by bead 12') and the mounting cup assembly 14' then crimped to the container bead 12' to provide a sealed container. A suitable pressure generating propellent is introduced into the outer container.

This dispensing package is particularly well adapted for dispensing corrosive substances, as well as substances which are preferably dispensed free from any propellent. For such latter uses, the sole ingredient is contained in the inner container, and the outer container contains only propellent. If it is not desired to dispense propellent, the valve assembly is constructed to provide no access for propellent to the discharge passage provided for the inner container ingredient through dip tube 124 and valve stem 120. A suitable bleeder valve for propellent may be provided in the conventional manner, and located remotely from the ingredient discharge passage. If a mixture of ingredients are to be dispensed, or if a propellent-ingredient mixture is to be dispensed, then a valve assembly such as shown in FIG. 1 may be provided, with communication from both inner and outer containers to a mixing region.

As in the embodiment of FIG. 1, upon opening of the valve assembly (depressing valve stem 120) the pressure of propellent in outer container 10' against the thin wall of inner container 122 causes material to flow out of container 122, through dip tube 124 and valve stem 120, to atmosphere. Upon releasing valve stem 120, suitable spring means within the valve assembly (such as spring 40 of FIG. 1) will close the valve assembly. The support web 130 prevents collapse of the bag 122 in the vicinity of the dip tube port 129 to assure that the entire contents of the container 122 will be dispensed. The grooves 131, in addition to providing structural support for the web 130, provide flow channels for passing ingredients into the chamber opposite dip tube port 129.

Among the metal-corrosive substances which may be dispensed from this dispensing package are water-base antiperspirants, shampoos and various detergents such as rug shampoo and window cleaners. Water-base antiperspirants are preferred to alcohol-base antiperspirants because they are both more pleasing and comfortable to apply (no alcohol sting) and do not form, as does alcohol, solvents for propellent ("Freon" propellents are water-insoluble). In addition, water base products also, being more stable, have longer shelf lives.

This dispensing package, if made propellent impermeable, would also be suited to dispensing viscous or gummy materials, such as gel-like shaving preparations, hair treatments, and the like, which may be dispensed as a viscous liquid or as a foam (typically, by admixing a hydrocarbon propellent). Various foodstuffs, such as peanut butter, jams, etc., as well as toothpastes could be dispensed in this manner, without propellent mixture.

In FIG. 7, the dispensing package for a two-component system shown has a rigid walled outer container 10", like that of FIG. 1, 5 inches long and 2 inches in diameter, that has a 1 inch diameter opening defined by bead 12" in its top wall, to which mounting cup 14" is secured. A suitable valve assembly is supported within cup 14", and includes a polyethylene housing 168, that has at its lower end a flange surface or rib 169. The protruding lower end of valve stem 170 has a tapered lower surface 172. The valve assembly also has an ingredient passage diagrammatically indicated at 173 which may terminate, e.g., at a metering orifice such as orifice 52 of FIG. 1, leading to a mixing chamber within the valve assembly. The valve assembly is otherwise substantially the same as that shown in FIG. 1. A dip tube 174 (outer diameter 0.175 inch, inner diameter 0.140 inch, of non-irradiated polyethylene) is secured (e.g., heat-sealed) to stem 170.

Polyethylene inner container 178 has a total length of 5 ¼ inches. Body portion 179 has a diameter of 2 ¼ inches, and a wall thickness of about 0.005 inch. The neck portion 181 has an inner diameter of about 0.300 inch and a wall thickness of about 0.043 inch; the mouth portion 183 has an inner diameter of about 0.495 inch and a wall thickness of about 0.035 inch; and the bottom portion 185 has an inner diameter of about 0.300 inch and a wall thickness of about 0.043 inch. The dip tube 174 extends about one-eighth inch below the end of container 178, and hence communicates with outer container 10', whereas passage 173 communicates with inner container 178.

Figure 8:
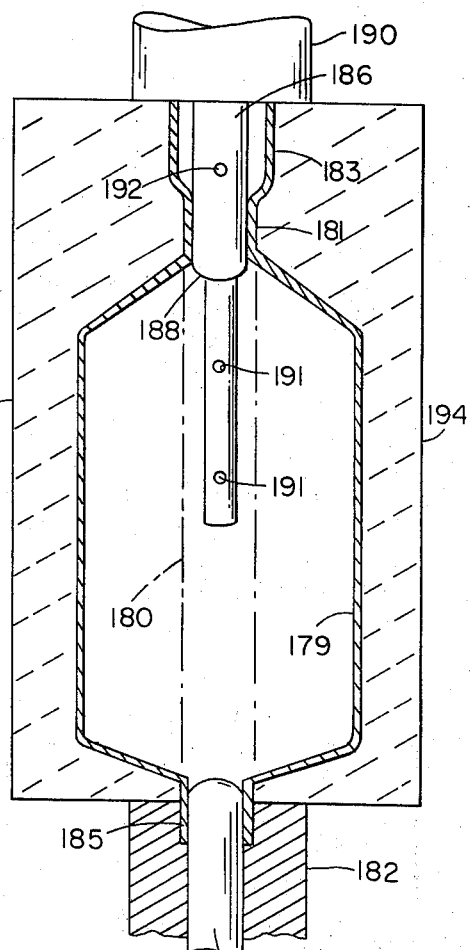

In a method of forming inner container 178, as shown in FIG. 8, a section of irradiated, expanded polyethylene tubing 180 is provided, having an inner diameter of 0.300 inch, a wall thickness of 0.043 inch, and a length of 5 ¼ inches. The lower end of the tubing 180 is positioned in a heat sink collar 182, with clamp mandrel 184 inserted. A second mandrel 186 has a stub 188 inserted into the upper end of tubing 180, and an annular heat sink collar 190 attached. Ports 191 extend through the mandrel stub 188 for introducing air into the part of tubing 180 below what is to be neck portion 181, whereas another mandrel port 192 is located to introduce air to the top region of the tube, which is to be mouth portion 183, to expand the tube there. The tubing, with mandrels, is heated to 260°F, and placed between mold members 193, 194, which are then moved into closed position as shown in FIG. 8. Air is introduced through the ports 191 and 192 to expand the tubing in a blow molding operation against the cool surfaces of the mold members 193, 194 to form the container 178. The mandrels 184 and 186 prevent the neck portion 181 and bottom portion 185, respectively, from shrinking during expansion of the rest of the tube. The mold members 193, 194 are then opened and the mandrels 184, 186 are removed.

The valve assembly is attached to the end of the dip tube 174 and the dip tube is then inserted through mouth portion 183 and neck portion 181, completely through container 178, until it protrudes past the bottom portion 185 of the container, with valve rib 169 disposed within mouth portion 183. The bottom portion 185 of the container is then heated and it shrinks into intimate compressive engagement with dip tube 174 to form a strong, leakproof mechanical seal between the inner container 178 and the dip tube 174, preventing fluid communication between the inner and outer containers. The inner container is then filled with its ingredient, such as hydrogen peroxide, and the mouth portion 183 is then heated (while thermally isolating neck portion 181 to avoid shrinkage which would seal the neck portion against the dip tube and hence prevent access to ingredient passage 173) until it shrinks into intimate, compressive engagement with flange surface 169 to seal inner container 178 from the valve assembly. The outer container 10" is then filled with its ingredient (e.g., soap solution and reductant), and the filled inner container assembly is inserted into the outer container, the inner container 178 being compressed as it passes through the opening defined by bead 12". The mounting cup assembly is crimped to the container bead 12", thus providing a sealed container. A suitable pressure generating propellent is introduced into the outer container. The operation of this container, with the valve assembly shown in FIG. 1, is similar to FIG. 1.

While particular embodiments of the invention have been shown and described, other modifications thereof will be apparent to those skilled in the art and therefore it is not intended that the invention be limited to the disclosed embodiments or to details thereof and departures may be made therefrom within the spirit and scope of the invention as defined in the claims.

What is claimed is:

1. In a method of manufacturing a pressurized dispensing package having an outer container, an inner container containing an ingredient disposed within said outer container, the ingredient being sealed from said outer container and a dispensing valve assembly secured to said outer container and in communication with said inner container which includes the steps of forming said inner container and securing said inner container to said valve assembly, wherein the improvement comprises the steps of:

securing at least one end portion of a length of organic plastic tubing, of the type shrinkable from a first stable dimension to a second stable dimension upon application of heat, to a thermal isolation member, heating another portion of said tubing and disposing said another position in a mold, expanding said heated another portion of said tubing against the wall of said mold by increasing the pressure in the interior of said another portion and then cooling said expanded another portion to form an inner container having a stable thin walled tubular flexible body portion, and at least one end portion defined by the portion secured to said thermal isolation member of greater wall thickness and less flexibility than said body portion, securing said one end portion of said inner container to said valve assembly by inserting said one end portion over a portion of said valve assembly and, heating said one end portion to shrink said one end portion toward said second dimension and form a mechanical joint between said one portion and said valve assembly portion.

2. The method as claimed in claim 1 wherein said valve assembly portion includes a dip tube structure, and said improvement includes the steps of inserting said end portion over said dip tube structure and shrinking said end portion against said dip tube structure to form said mechanical joint.

3. The method as claimed in claim 1 wherein said another portion is expanded until the wall thickness of said body portion is less than 20% of the wall thickness of said end portion.

4. The method as claimed in claim 1 wherein said valve assembly includes a dip tube structure and said improvement includes the steps of inserting said dip tube structure through said one end portion into said body portion until the inner end of said dip tube is adjacent the other end portion of said tubing, and sealing the inner end of said dip tube to said other end portion, prior to shrinking said one end portion to form said mechanical joint.

5. The method as claimed in claim 4 wherein said one end portion is heat shrunk around said dip tube near the outer end of said tube so that the ingredient in said inner container exits said inner container through said dip tube.

6. The method as claimed in claim 1 wherein both end portions of said length of heat shrinkable plastic tubing are secured to thermal isolation structure while said another portion is being expanded, and said another portion is between said end portions.

7. The method as claimed in claim 1 wherein said valve assembly includes a dip tube structure, said dip tube structure is inserted completely through said plastic tubing, and one of said end portions is heat shrunk against said dip tube adjacent the inner end of said dip tube to form a mechanical seal between said end portion and the outer wall of said dip tube, providing a bottom for said inner container, while allowing the inner end of said dip tube to be open to said outer container.

8. The method as claimed in claim 7 wherein both end portions of said length of heat shrinkable plastic tubing are secured to thermal isolation structure while said another portion is being expanded, and the other end portion is heat shrunk to said valve assembly adjacent the outer end of said dip tube to seal said inner container from said outer container.

9. The method as claimed in claim 8 wherein said another portion is expanded until the wall thickness of said body portion is less than 20% of the wall thickness of said mouth portion.

10. In a method of manufacturing a pressurized dispensing package which includes the steps of forming an inner container, disposing an ingredient to be dispensed in the inner container, securing the inner container to a valve assembly, and disposing the inner container-valve assembly in an outer container, wherein the improvement comprises the steps of:

securing one end portion of a length of organic plastic tubing, of the type shrinkable from a first stable dimensional state to a second stable dimensional state, upon application of heat, to a thermal isolation member, heating another portion of said tubing to reduce its diameter, forming a seal in the end of said other portion of said tubing, elongating said other portion of said tubing, disposing said elongated section of said tubing in a mold, expanding said elongated section against the cool wall of said mold by increasing the pressure in the interior of said elongated section to form an inner container having a stable thin walled tubular flexible body portion, and a mouth portion of greater wall thickness and less flexibility than said body portion defined by said end portion secured to said thermal isolation member, disposing said ingredient to be dispensed in said inner container, securing said mouth portion of said inner container to a portion of said valve assembly by inserting said mouth portion over said valve assembly portion and heating said mouth portion to shrink said mouth portion toward said second dimension and form a mechanical joint between said mouth portion and said valve assembly portion, and disposing said inner container-valve assembly in said outer container.

* * * * *